No. 656,829. Patented Aug. 28, 1900.
B. K. THOMAS.
COUPLING FOR VEHICLES, WAGONS, &c.
(Application filed Feb. 20, 1900.)
(No Model.)
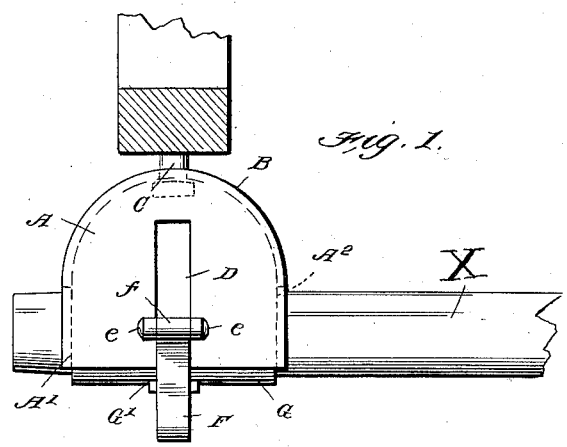
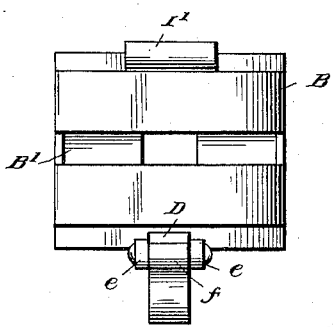
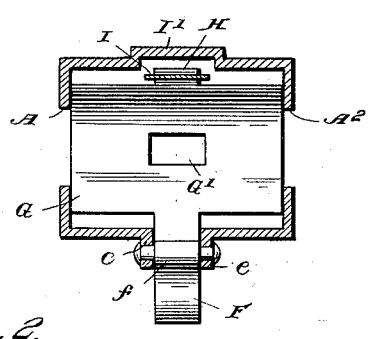
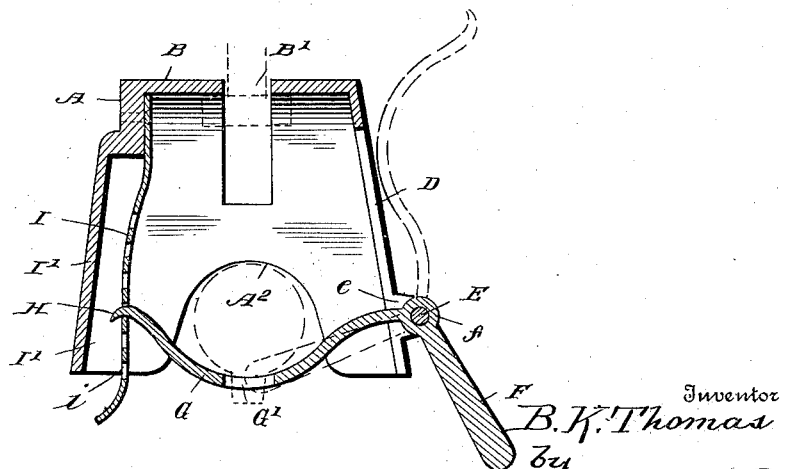
Witnesses
Inventor
B. K. Thomas
by
Milo B. Stevens & Co.
Attorneys

UNITED STATES PATENT OFFICE.

BENJIMAN K. THOMAS, OF ALEXANDRIA, NEBRASKA.

COUPLING FOR VEHICLES, WAGONS, &c.

SPECIFICATION forming part of Letters Patent No. 656,829, dated August 28, 1900.

Application filed February 20, 1900. Serial No. 5,892. (No model.)

*To all whom it may concern:*

Be it known that I, BENJIMAN K. THOMAS, a citizen of the United States, residing at Alexandria, in the county of Thayer and State of Nebraska, have invented certain new and useful Improvements in Couplers for Vehicles, Wagons, Machines, and the Like; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a coupler primarily intended for coupling vehicles, wagons, machines, and the like one to the other and is adapted to be secured in suitable position on a wagon or the like to receive and grip the tongue of another vehicle or other similar draft means.

The invention has for one object to provide a coupler by means of which the tongue of one vehicle, for instance, may be quickly and easily attached to or connected with a vehicle ahead of it and on which the coupler is secured.

A further object is to provide the coupler with a locking-jaw adapted to be thrown into locking position by the movement of the tongue into coupling position.

A further object is to provide a coupler which will permit the necessary movement of the tongue of the trailing vehicle or the like in passing over hilly or uneven ground and in turning corners, making sharp turns, and the like without causing a strain on the tongue.

A further object is to so construct the parts of the coupler that the strain or draft will be taken by the coupler-head and the jaw-pivot and lock will be relieved.

A further object is to provide a coupler with a swinging jaw which will be retained normally opened and ready for the insertion of the tongue and which when the tongue is inserted will be thereby thrown into rocking and holding position.

Further objects and advantages of the invention will appear from the following description.

With such objects in view the invention is embodied in the parts, arrangement, and combinations of parts hereinafter described, and particularly set forth in the claims.

In the accompanying drawings I have illustrated one form of a coupler embodying my invention, but desire it understood that I do not wish to be limited to the construction, which is shown for the purpose of an understanding of the invention.

In the drawings, Figure 1 shows in elevation a coupler secured to the rear axle of a wagon with the tongue of another wagon or vehicle held therein. Fig. 2 is an enlarged transverse sectional view showing the jaw in closed position and showing in dotted lines the jaw opened. Fig. 3 is a plan view. Fig. 4 is a horizontal sectional view through the coupler.

Referring to the drawings, wherein like reference characters refer to similar parts throughout the several views, A indicates a coupler-head which, as shown in the drawings, is of generally semicircular vertical section—that is, having an arched or curved top B, which is provided with an elongated slot, (indicated at B'.) The head A may be constructed of any convenient or desired material and in any suitable manner—for instance, it may be cast in one piece. The head A is suspended beneath the wagon or the like, as by a headed bolt C, secured to any suitable part of the wagon, as the rear axle or bolster, the bolt passing through and working in the slot B' and the head of the bolt projecting laterally under the edges of the slot in the top B.² By this manner of suspension it will be seen that the head can turn or swivel on the bolt horizontally and can also swing or move vertically. The front and rear sides of the head A are provided at A' and A² with substantially-semicircular bearing sockets or openings for the tongue of the trailing vehicle, (indicated at $x$.) One side of the head A is provided, as shown, with an opening, (indicated at D,) and spanning this opening, at or near its lower end, is a pivot or journal E for the swinging coupler-jaw. The journal E is shown as passing through and secured in bearing-lugs $e$ on opposite sides of the opening.

F indicates an arm or lever provided with a suitable bearing $f$, through which the journal E passes, this arm or lever F carrying the jaw proper, which is indicated at G. The arm or lever F, as shown, is bent or curved and is weighted at its end sufficiently to hold the jaw G in its open position. (Indicated by dotted lines in Fig. 2.) In the swinging of the lever and jaw the weighted end of the lever is adapted to pass through the hole or opening D, the jaw G contacting with the side of the head when the jaw is open and the weighted end of the lever being thereby held in a substantially-horizontal position within the head A. The jaw G, as shown, is curved or substantially semicircular in cross-section and is provided with an opening G', in which the holdback-iron on the end of a pole is adapted to engage. The jaw G at its side opposite the lever F is provided with a suitable means for holding the jaw in closed position. Such means I have shown in the drawings as being a hook or bill H, secured to the jaw, which hook is adapted in the closing movement of the jaw to contact with and force outwardly a spring plate or piece I, shown as secured to the side of the head A and adapted to swing into a recess I' in the head sufficiently to permit the movement of the bill H. The spring-plate I is provided with a series of shoulders or engaging portions $i$, with which the hook or bill H is adapted to engage to prevent the opening of the jaw. Such shoulders $i$ I have shown as being provided by forming openings or holes in the spring-plate I. The spring-plate I by its resiliency or spring action is normally held inward and in locking position, so that in the swinging of the jaw the hook or bill will strike said plate and force it outward against the action of its spring, the plate preventing by the engagement of one of its shoulders with the hook the opening of the jaw. It is evident that a great variety of automatically-operating locking devices may be provided without departing from the scope of my invention.

It will be observed that the jaw G is so shaped and positioned that when in closed position its ends or a suitable part thereof engages suitable parts, such as the front and rear ends of the head, thereby when strain is placed on the jaw relieving the pivot and locking devices for the jaw.

Having thus described the invention, it operates in substantially the following manner: Supposing the parts to be in the position indicated by the dotted lines in Fig. 2—that is, with the jaw opened—the weighted end of the lever F will lie within the head in a substantially-horizontal position. To secure a pole in the coupling, the forward end of the pole having the holdback-iron thereon is moved vertically upward into the bearing-sockets A' and A². In this movement of the pole it engages the weighted end of the lever F, which by a quick upward movement of the pole is caused to move upward and throw the jaw G down under the pole, the holdback-iron on the pole entering the hole G' in the jaw. The spring locking device will hold the jaw in this position and the pole will be securely connected with the coupler. To release the pole, it is simply necessary to move the spring-plate I outward and disengage the hook H. For this purpose the spring-plate may, if desired, be provided with an operating extension.

Having thus described my invention, what I claim as new, and desire to secure by Letters Patent, is—

1. The combination with a suitable suspending device, of a coupler swiveled thereon and comprising a movable jaw, provided with means for engaging and holding a tongue, and a locking device for said jaw, substantially as described.

2. The combination with a suspending device, of a coupler-head movably held thereon having bearing-sockets for a pole, a jaw movably connected with said coupler-head and adapted to support the tongue in said bearing-sockets, and a lock device for said jaw, substantially as described.

3. In a coupler for the purpose described, the combination of a head having suitable bearings for a tongue, a jaw pivoted to said head and adapted to lie on the side of the tongue opposite said bearings, the jaw being provided with suitable means for engaging and holding the tongue in the head, and a lock device for holding said jaw in closed position, substantially as described.

4. In a coupler for the purpose described, a head having suitable bearings for a tongue or the like, a jaw pivoted thereto and adapted to swing in a vertical plane and provided with suitable means for engaging and holding said tongue in the head, and a lock device for holding said jaw in closed position, substantially as described.

5. In a coupler for the purpose described, the combination of the head having in its opposite ends bearing-sockets for a pole or the like, a jaw pivoted to said head and adapted when closed to lie on the side of the pole opposite said bearing-sockets, and a lock device acting automatically upon the closing of the jaw to hold the same in closed position, substantially as described.

6. In a coupler for the purpose described, a head having in its opposite ends bearings for a tongue or the like, a jaw pivoted to said head and adapted when closed, to lie on the side of the tongue opposite said bearings, a lock device for said jaw, and coöperating portions on said jaw and head adapted to engage and relieve said lock device and jaw-pivot from strain, substantially as described.

7. In a coupler for the purpose described, the combination of a coupler-head having bearing-sockets in opposite ends, a jaw pivoted to one side of said coupler, a weighted lever connected to said jaw and adapted to swing through an opening in the coupler-head side and adapted to occupy a position within the head when the jaw is open, and a lock device for said jaw, substantially as described.

8. In a coupler for the purpose described, the combination with a coupler-head having an upper curved or arched part provided with an opening by which the coupler-head is suspended from above, the opposite ends of said coupler-head having bearing-sockets for a pole or the like, a jaw pivoted to the side of said coupler-head, a weighted lever secured to said jaw and adapted to pass through an opening in the side of the coupler-head, and a lock device for holding said jaw in closed position, substantially as described.

9. In a coupler for the purpose described, the combination of a head having an arched top provided with an elongated slot in which a suspending means is adapted to engage, the opposite ends of said head having bearing-sockets for a pole or the like, a lever pivoted to the side of said coupler-head, a jaw curved in cross-section and having an opening therein secured to said lever, said lever being weighted at one end and adapted to pass through a hole in the coupler-head side, a hook on said jaw, and a spring-plate secured to said coupler-head having shoulders with which said hook is adapted to engage, substantially as described.

In testimony whereof I affix my signature in presence of two witnesses.

BENJIMAN K. THOMAS.

Witnesses:
R. A. HARVEY,
F. J. SIEBER.